United States Patent [19]

Takeuchi

[11] 4,358,990
[45] Nov. 16, 1982

[54] NEGATIVE PRESSURE BOOSTER

[75] Inventor: Hiroo Takeuchi, Ueda, Japan

[73] Assignee: Nissin Kogyo Kabushiki Kaisha, Ueda, Japan

[21] Appl. No.: 227,411

[22] Filed: Jan. 22, 1981

Related U.S. Application Data

[63] Continuation of Ser. No. 11,707, Feb. 12, 1979, abandoned.

[30] Foreign Application Priority Data

Aug. 31, 1978 [JP] Japan ................................ 53-134925

[51] Int. Cl.³ ........................... F15B 9/10; F15B 15/24
[52] U.S. Cl. ................................ 91/376 R; 91/369 A; 92/13.2; 92/13.8
[58] Field of Search ............. 91/369 A, 369 B, 369 R, 91/376 R; 60/554, 552; 92/13.2, 13.8

[56] References Cited

U.S. PATENT DOCUMENTS

| 3,312,147 | 4/1967 | Reichard | 91/369 A |
| 3,452,646 | 7/1969 | Abbot et al. | 91/369 A |
| 3,977,299 | 8/1976 | Gardner | 91/376 R |

FOREIGN PATENT DOCUMENTS

| 969999 | 6/1975 | Canada | 91/369 A |
| 1363242 | 8/1974 | United Kingdom | 91/369 B |

Primary Examiner—Paul E. Maslousky
Attorney, Agent, or Firm—Armstrong, Nikaido, Marmelstein & Kubovcik

[57] ABSTRACT

A negative pressure booster wherein a brake master cylinder of an automobile is boosted and operated under negative pressure. The booster comprises a booster shell, a booster piston to divide the interior of the booster shell into a first and second actuator chambers, a valve cylinder, a valve piston received in the valve cylinder and a resilient valve body. During the retraction of the valve piston, the retracting force thereof is supported on the resilient valve body so that as the retracting force increases, the gap between the first valve seat and the valve portion increases.

3 Claims, 3 Drawing Figures

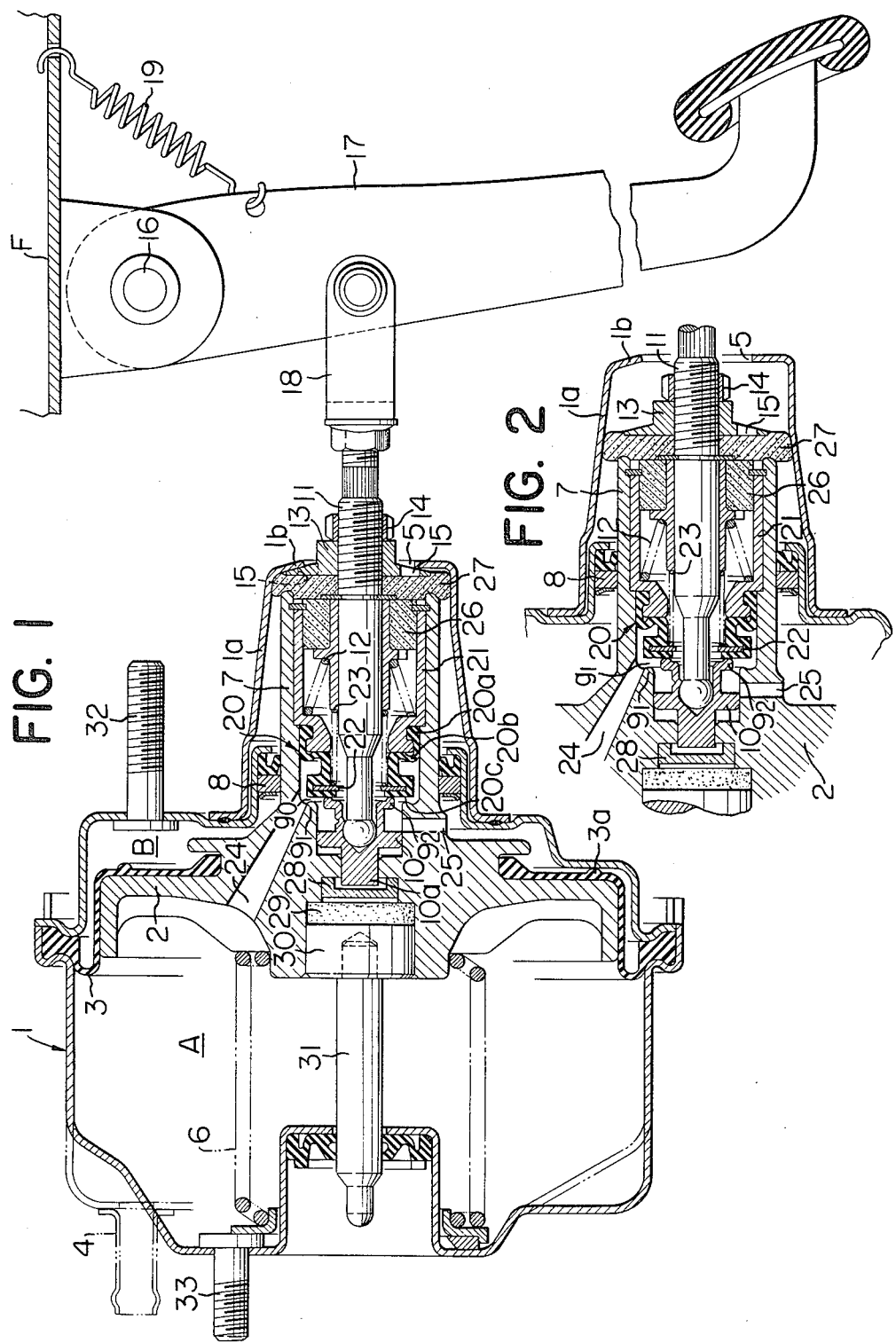

NEGATIVE PRESSURE BOOSTER

This is a continuation of application Ser. No. 11,707 filed Feb. 12, 1979 now abandoned.

BACKGROUND AND SUMMARY OF THE INVENTION

The present invention principally relates to negative pressure boosters in which a brake master cylinder of an automobiles is boosted and operated under negative pressure, and more particularly to a booster comprising a booster piston which divides the interior of a booster shell into a first operating chamber internally communicated with a negative pressure source and a second operating chamber, and a valve cylinder protruded at the rear of the booster piston and having a first annular valve seat disposed at the front portion thereof, the valve cylinder slidably receiving a valve piston having a second annular valve seat encircled by said first valve seat and connected to an input rod and including a cylindrical resilient valve body having a valve portion biased to be seated on said first and second valve seats and inside of which is open to the atmosphere, whereby when said valve piston is retracted, said first and second operating chambers are brought into communication through a clearance formed between said first valve seat and said valve portion whereas when said valve piston is moved forward, said second operating chamber and said inside of said valve body are brought into communication through a clearance formed between said second valve seat and said valve portion.

In the booster of the type as described, in an attempt to minimize lost stroke of the input rod in the early stage of operation to prevent the operation delay of the booster piston, it is necessary to reduce the clearance between said valve seat and said valve portion as narrow as possible in an inoperative condition of the input rod, and in an attempt to improve the return responsiveness of the booster piston when the input rod is retracted, it is necessary to increase the clearance between said first valve seat and said valve portion as wide as possible conversely to the former. Thus, there are two requirements contrary to each other.

It is therefore an object of the present invention to provide a booster which can satisfy these two requirements, which can absorb the impact force of retraction of the valve piston and which is quiet and excellent in durability.

BRIEF DESCRIPTION OF THE DRAWINGS

Further objects and features of this invention will become apparent from the following description and from the accompanying drawings, wherein:

FIG. 1 is a longitudinal sectional side view of the device in an inoperative state of a first embodiment;

FIG. 2 is a partial diagrammatic view showing the retracting mode; and

DESCRIPTION OF THE PREFERRED EMBODIMENTS

Figure 3:
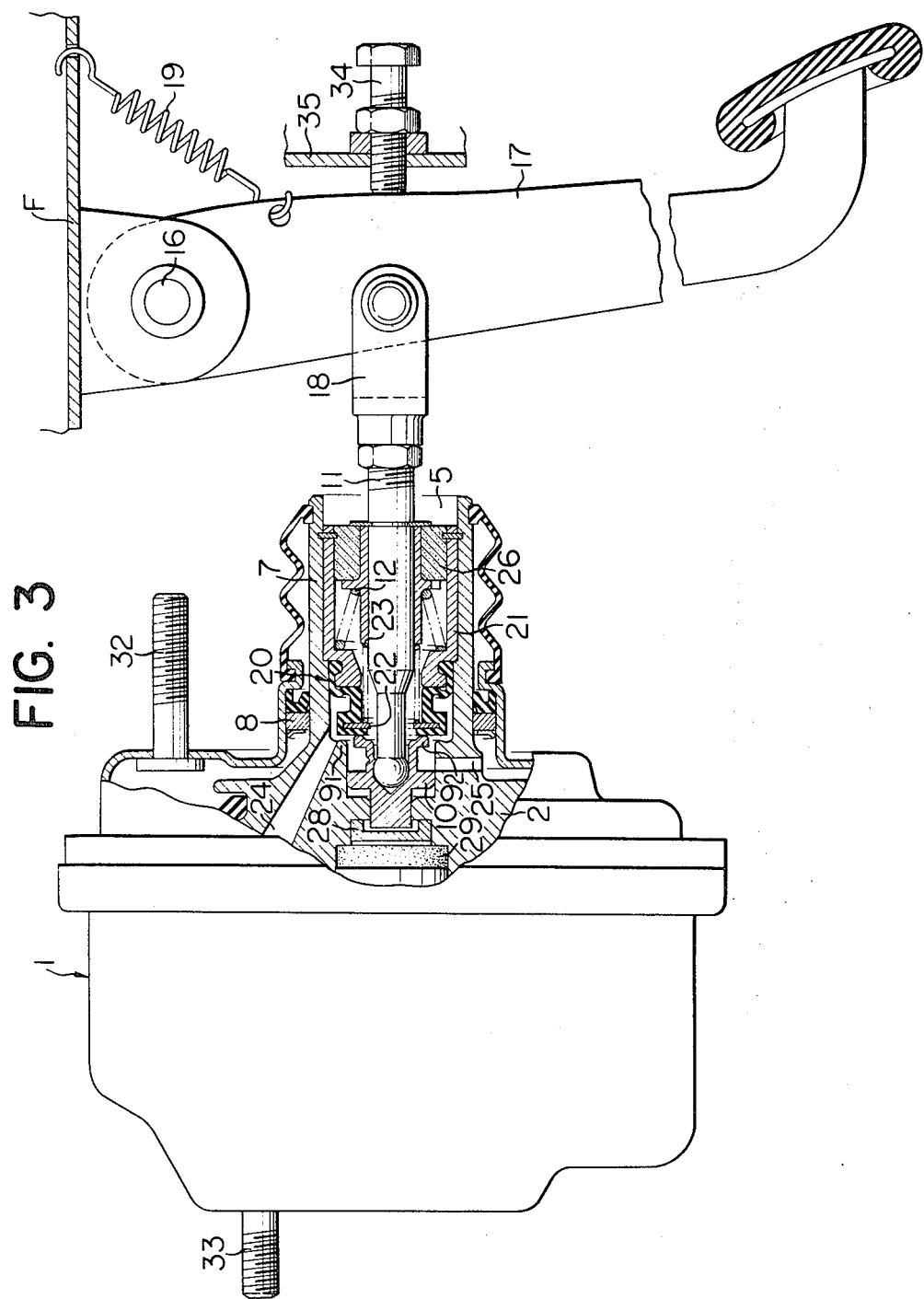
FIG. 3 is a longitudinal side view of essential parts corresponding to those of FIG. 1 in a second embodiment.

Referring now to FIG. 1 which illustrates a first embodiment, the booster has a booster shell 1, interior of which is divided into a first front operating chamber A and a second rear operating chamber B by a booster piston 2 and a diaphragm 3 joined to the back surface thereof, the first operating chamber A being normally communicated with the interior of an intake manifold (not shown) of an internal combustion engine as a negative pressure source through a negative pressure introducing pipe 4 fixedly mounted on the front surface of the booster shell 1. The booster shell 1 has a rearwardly extending cylinder 1a, to an end wall 1b of which is open an atmosphere inlet 5.

The booster piston 2 is normally spring-biased, by a return spring 6 retained in the first operating chamber A, in a direction of retraction, that is, towards the second operating chamber B, the retracting limit thereof being regulated as an annular rib 3a protruded from the back surface of the diaphragm 3 bears on the rear wall of the booster shell 1.

The booster piston 2 is integrally formed with a valve cylinder 7 protruded axially from the rear surface in the center thereof, which is supported slidably on a flat bearing 8 disposed in the extending cylinder 1a and which rear end is open towards the atmosphere inlet 5. The valve cylinder 7 is formed with an annular valve seat $9_1$ on the front inner wall thereof.

In the front portion of the valve cylinder 7 is slidably received a valve piston 10 connected to the front end of an input rod 11, and the piston 10 has a rear end formed with an annular valve seat $9_2$ encircled by the first valve seat $9_1$.

The input rod 11 is normally spring-biased by a return spring 12 in a direction of retraction, the retracting limit thereof being regulated as a movable stopper plate 13 threadably mounted on the input rod 11 bears on the inner side of the end wall 1b. Thus, when the stopper plate 13 is rotated, the meshing position between the stopper plate and the input rod 11 varies so that the retracting limit of the input rod 11 may be laterally adjusted. After such adjustment, the stopper plate 13 may be locked by tightening a locknut 14 similarly threadably engaged with the input rod 11. The movable stopper plate 13 has a vent hole 15 bored therein so as not to block the atmosphere inlet 5.

To the rear end of the input rod 11 is connected a brake pedal 17 pivotally supported at 16 on the body F of an automobile through a well known an adjustable connecting member 18, the brake pedal 17 having a return spring 19 connected thereto to bias the pedal backwards.

A base end 20a of a cylindrical valve body 20 with opposite ends opened is retained on the inner wall of the valve cylinder 7 through a valve body holding cylinder 21 fitted in the valve cylinder 7. The valve body 20 is formed of a resilient material such as rubber, and a diaphragm 20b of thin wall thickness extends radially and inwardly from the base end 20a and a valve portion 20c of thick wall thickness is provided adjacent the inner peripheral end thereof, the valve portion 20c being opposed to the first and second valve seats $9_1$ and $9_2$. The valve portion 20c may be moved back and forth by deformation of the diaphragm 20b and may also bear on the front end of the valve body holding cylinder 21.

An annular reinforcing plate 22 is embedded in the valve portion 20c, and a valve spring 23 is permitted to act on the reinforcing plate to urge the valve portion 20c against both the valve seats $9_1$ and $9_2$.

The outer portion of the first valve seat $9_1$ is normally communicated with the first operating chamber A through a bore 24 of the booster piston 2, the intermediate portion of the first and second valve seats $9_1$, $9_2$ communicated with the second operating chamber B through a further bore 25, and the inner portion of the second valve seat $9_2$ connected with the atmosphere inlet 5 through the interior of the valve body 20, respectively.

The valve cylinder 7 has an opening at its outer end provided with filters 26 and 27 adapted to purify air introduced through the atmosphere inlet 5 and capable of being deformed so as not to impair the operation of the input rod 11.

In the central portion at the front surface of the booster piston 2, there are disposed successively from its inner part, a pressure receiving piston 28, a resilient piston 29 formed of rubber or the like of a diameter larger than the piston 28 and an output piston 30 of the same diameter as the piston 29, the pressure receiving piston 28 having a small shaft 10a, which extends from the front end of the valve piston 10, faced thereto, and the output piston 30 having a base end of an output rod 31, which slidably extends through the front wall of the booster shell 1, connected thereto. The output rod 31 is connected to a piston of a well known brake master cylinder not shown to drive the same.

In the drawings, reference numeral 32 indicates a bolt used to fasten the booster shell 1 to the body F of an automobile, and 33 indicates a bolt used to connect the cylinder body of the brake master cylinder to the front surface of the booster shell 1.

In the following, the operation of the above-mentioned embodiment will be explained. The valve piston 10, input rod 11 and brake pedal 17, which are interconnected, are held in retracted position at which the movable stopper plate 13 bears on the fixed end wall 1b by the spring force of the return springs 12 and 19. The valve piston 10 urges the front surface of the valve portion 20c through the second valve seat $9_2$ and retracts it until the latter lightly comes into contact with the front surface of the valve body holding cylinder 21, thereby forming a small gap $g_0$ between the first valve seat $9_1$ and the valve portion 20c. This mode of state may be readily obtained by adjustment of the movable stopper plate 13 as previously described.

With the foregoing, the first operating chamber with negative pressure always accumulated comes into communication with the second operating chamber B through the bore 24, gap $g_0$ and bore 25, and the opening at the front surface of the valve portion 20c is closed by the second valve seat $9_2$ so that the negative pressure in the first operating chamber A is transmitted to the second operating chamber B to balance pressures of both operating chambers A and B. As a result, the booster piston 26 also assumes the illustrated retracted position by the bias of the return spring 6.

When the brake pedal 17 is worked to brake the vehicle to move the input rod 11 and valve piston 10 forwardly, the valve portion 20c frontwardly urged by the valve spring 23 moves forward following the valve piston 10. However, since the gap $g_0$ between the first valve seat $9_1$ and the valve portion 20c is very small as previously mentioned, the valve portion 20c immediately sits on the first valve seat $9_1$ to cut off the communication between both the operating chambers A and B and at the same time the second valve seat $9_2$ is disengaged from the valve portion 20c to cause the second operating chamber B to communicate with the interior of the valve body 20 or the atmosphere inlet 5 through the bore 25. Accordingly, the atmosphere is rapidly introduced into the second operating chamber B and as a consequence, the second operating chamber B becomes higher pressure than the first operating chamber A and the booster piston 2 moves forward against the return spring 6 due to a pressure difference formed between both the chambers A and B to advance the output rod 31 through the resilient piston 29 and the output piston 30, whereby the brake master cylinder not shown is actuated to brake the vehicle.

On the other hand, when the small shaft 10a of the valve piston 10 advances and then bears on the resilient piston 29 through the pressure receiving piston 28, inflated deformation of the resilient piston 29 towards the pressure receiving piston 28 due to the operative reaction of the output rod 31 causes a part of said reaction to be fed back towards the brake pedal 17 through the valve piston 10, whereby the operator may sense the output or the braking force of the output rod 31.

Next, when the brake pedal 17 is released, the brake pedal 17, input rod 11 and valve piston 10 are retracted by the force of the return springs 19 and 12 to first cause the second valve seat $9_2$ to seat on the valve portion 20c as shown in FIG. 2 and at the same time cause the same to disengage from the first valve seat $9_1$, as a consequence of which pressures of both operating chambers A and B are balanced through the gap $g_1$ formed between the first valve seat $9_1$ and the valve portion 20c so that the booster piston 2 is retracted by the force of the return spring 6 to release the braking.

Here, special emphasis must be placed on the fact that during the retraction of the valve piston 10, the gap $g_1$ increases as the retracting force of the valve piston 10 increases. That is, when the valve piston 10 vigorously retracts, the valve portion 20c is not only brought to bear on the front end of the valve body holding cylinder 21 but the portion 20c is subject to axial compression and deformation. Accordingly, the gap $g_1$ increases more than the gap $g_0$ in the inoperative state shown in FIG. 1 by the amount of compression and deformation of the valve portion 20c. As the gap $g_1$ increases, the resistance of flow passage between the first valve seat $9_1$ and the valve portion 20c naturally decreases, and pressures of both operating chambers A and B are rapidly balanced accordingly to reduce the time delay of commencement for retraction of the booster piston 2.

It will be noted that the retracting impact force of the valve piston 10 is absorbed into the compression and deformation of the valve portion 20c.

Then, when the booster piston 2, valve piston 10, input rod 11 and brake pedal 17 are returned to the predetermined retraction position shown in FIG. 1, the valve portion 20c is released from compression by the valve piston 10 or less compressed so that the gap $g_1$ is again narrowed to the gap $g_0$ before the brake pedal 17 is worked for the succeeding operation.

FIG. 3 shows a second embodiment of the present invention, in which in order to control the retracting limit of the output rod 31 and brake pedal 17, a laterally adjustable stopper bolt 34 capable of supporting the back of the brake pedal 17 is provided on a fixed wall 35 within a vehicle room in place of the movable stopper plate 13 and the fixed end wall 1b used in the first embodiment, and other constructions and operations are similar to the first embodiment. In FIG. 3, parts corresponding to those in the first embodiment bear like reference numerals.

As described above, in accordance with the present invention, during the retraction of the valve piston, the retracting force thereof is supported on the resilient valve body so that as the retracting force increases, the gap between the first valve seat and the valve portion increases. It is therefore possible to narrow the gap between the first valve seat and the valve portion in the inoperative state of the device whereas to widen suitably during the retraction of the valve piston. Accordingly, it is possible to minimize lost stroke of the input rod corresponding to the gap between the first valve seat and the valve portion when the input rod is operated, thus preventing the operation delay of the booster piston, whereas it is possible to effect rapid balancing of pressures of both first and second operating chambers to improve the return responsiveness of the booster piston. In addition, since the retracting impact force of the valve piston is permitted to be absorbed into the valve body, it is possible to prevent occurrence of noises caused by the impact, thus providing a booster device which is quiet and high in durability.

What is claimed is:

1. An improved negative pressure booster for use in an automatic braking system including a braking pedal moveable in a brake engaging direction and retracting direction, the negative pressure booster comprising:

a booster shell, a booster piston within the booster shell dividing the shell into a first chamber which is connected to a negative pressure source and a second chamber alternately operative at the same negative pressure and atmospheric pressure, an output rod connected to said booster piston in said first chamber, an input rod connected to the braking pedal on the other side of the booster piston from the output rod, the input rod engaging the booster piston for driving the output rod, a first return spring in the first chamber biasing the booster piston in the direction of the input rod, a valve cylinder connected to the booster piston on the side of the input rod and having an inner wall, a resilient cylindrical valve body having a first end and an operative end, the valve body being mounted at the first end to the valve cylinder, the interior of the valve body and the valve cylinder being constantly open to atmospheric pressure, a first annular valve seat on the booster piston facing the operative end of the valve body and cooperating therewith to intercept communication between the first and second chambers when the braking pedal is moved in the engaging direction, a second annular valve seat disposed on a front end of the input rod facing the operative end of the valve body and cooperating therewith for intercepting communication between the second chamber and the interior of the valve cylinder at atmospheric pressure when the braking pedal is moved in the retracting direction, a valve spring mounted in the valve body biasing the operative end towards the second annular valve seat, a second return spring connected to the input rod biasing the input rod in the retracting direction of the braking pedal producing a retracting force pedal, wherein when the braking pedal is retracted, a small first gap is present between the first valve seat and the operative end of the valve body and a second gap is closed between the second valve seat and the operative end of the valve body whereby vacuum is introduced from the first chamber to the second chamber; and when the braking pedal is engaged, the second gap is present and the first gap is closed whereby atmospheric pressure is introduced into the second chamber from the interior of the valve cylinder and the booster is activated;

the improvement wherein the booster further comprises a valve body holding cylinder fixed on the inner wall of the valve cylinder, and stopper means adjustably attached to the input rod and engaging the booster shell for stopping movement of the input rod when the input rod reaches a normal retracted position, said stopper means being adapted to adjust the first gap when the input rod is at said retracted position; and wherein the first end of the valve body is an annular base end held between the valve cylinder and said valve body holding cylinder, the operative end of the valve body is a thick cylindrical end, and said annular base end and said thick cylindrical end are connected by a thin flex portion, said thick cylindrical end being placed into abutment against said holding cylinder to axially buckle when said thick cylindrical end receives the retracting force of the second return spring through the second valve seat during retraction of the braking pedal thereby increasing the first gap, said thick cylindrical end of the valve body being released from the retracting force when the input rod is in said retracted position thereby reducing the first gap to a normal amount which was increased during retraction of the braking pedal.

2. The booster according to claim 1, wherein: said valve body is formed of rubber.

3. The booster according to claim 1, wherein: said booster shell includes an inwardly directed annular end wall formed at the rear end of a cylinder projected from the rear surface of said booster shell to encircle said valve cylinder, and said stopper means comprises a stopper plate threaded on said input rod for axially adjusting movement and being adapted to abut against said inwardly directed annular end wall.

* * * * *